(12) United States Patent
Seki

(10) Patent No.: US 7,303,051 B2
(45) Date of Patent: Dec. 4, 2007

(54) BRAKE DEVICE FOR VEHICLE

(75) Inventor: Bunzo Seki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/273,124

(22) Filed: Oct. 18, 2002

(65) Prior Publication Data
US 2003/0136613 A1 Jul. 24, 2003

(30) Foreign Application Priority Data
Oct. 23, 2001 (JP) ............................. 2001-325558

(51) Int. Cl.
*B60T 1/06* (2006.01)

(52) U.S. Cl. .............. 188/18 A; 188/73.32; 188/73.34; 188/152

(58) Field of Classification Search ................ 188/17, 188/18 R, 18 A, 28, 70 R, 73.32, 73.33, 188/73.34, 152
See application file for complete search history.

(56) References Cited

U.S. PATENT DOCUMENTS

| | | | | |
|---|---|---|---|---|
| 3,584,717 A | * | 6/1971 | Suppes et al. | 192/70 |
| 4,352,414 A | * | 10/1982 | Scott | 188/73.34 |
| 4,600,074 A | * | 7/1986 | Watanabe et al. | 180/251 |
| 4,667,761 A | * | 5/1987 | Takayanagi | 180/217 |
| 4,719,984 A | * | 1/1988 | Watanabe | 180/226 |
| 4,732,241 A | * | 3/1988 | Yoshida | 188/73.34 |
| 4,823,920 A | * | 4/1989 | Evans | 188/73.34 |
| 5,111,914 A | * | 5/1992 | Thiel et al. | 188/73.34 |
| 6,182,800 B1 | * | 2/2001 | Mochizuki et al. | 188/71.5 |
| 6,616,563 B2 | * | 9/2003 | Inoue et al. | 475/198 |
| 2002/0027036 A1 | * | 3/2002 | Hori et al. | 180/241 |

* cited by examiner

*Primary Examiner*—Devon Kramer
(74) *Attorney, Agent, or Firm*—Birch, Stewart, Kolasch & Birch, LLP (57) ABSTRACT

A brake device for a vehicle such as an all terrain vehicle includes a brake disk fixed to a drive shaft, and a brake caliper for braking by a nipping action of the brake disk. The brake caliper is fitted to a final gear case on an outer side of the vehicle body frame. The brake device permits maintenance work to be easily carried out and with few obstructions from neighboring parts.

16 Claims, 11 Drawing Sheets

BACKGROUND ART

BRAKE DEVICE FOR VEHICLE

CROSS-REFERENCES TO RELATED APPLICATIONS

This nonprovisional application claims priority under 35 U.S.C. § 119(a) on Patent Application No. 2001-325558 filed in Japan on Oct. 23, 2001, the entirety of which is herein incorporated by reference.

BACKGROUND OF THE INVENTION

1. Field of the Invention

The present invention relates to a brake device for a vehicle, particularly to a brake device for a vehicle that is suitable for running on uneven or rough terrain.

2. Description of the Background Art

A vehicle for running on uneven or rough terrain, e.g., such as an ATV (All Terrain Vehicle) as shown in FIGS. 7 to 10 has been available in the background art. The vehicle 1 includes a vehicle body frame 3, an engine 2 mounted on a substantially central portion of the vehicle body frame 3, a pair of left-right front wheels 4 vertically suspended and capable of being oscillated at front, lower portions of the vehicle body frame 3, and a pair of left-right rear wheels 5 vertically suspended and capable of being oscillated at rear, lower portions of the vehicle body frame 3. The vehicle also includes a steering device 6 provided at a front portion of the vehicle body frame 3 for steering the front wheels, a fuel tank 7 provided on the rear side of the steering device 6, a seat 8 provided on the rear side of the fuel tank 7, a front fender 9 provided so as to cover the upper and rear sides of the front wheels 4, and a rear fender 10 provided so as to cover the upper and front sides of the rear wheels.

A pair of propeller shafts 11-12 for transmitting an output of the engine 2 to the front wheels 4 and the rear wheels 5 are provided on the front and rear sides of the engine 2, and final gear cases 15-16 for transmitting the output of the engine 2 to drive shafts 13-14 connected to axles of the front wheels 4 and the rear wheels 5 are provided at tip end portions of the propeller shafts 11-12.

Figure 11:
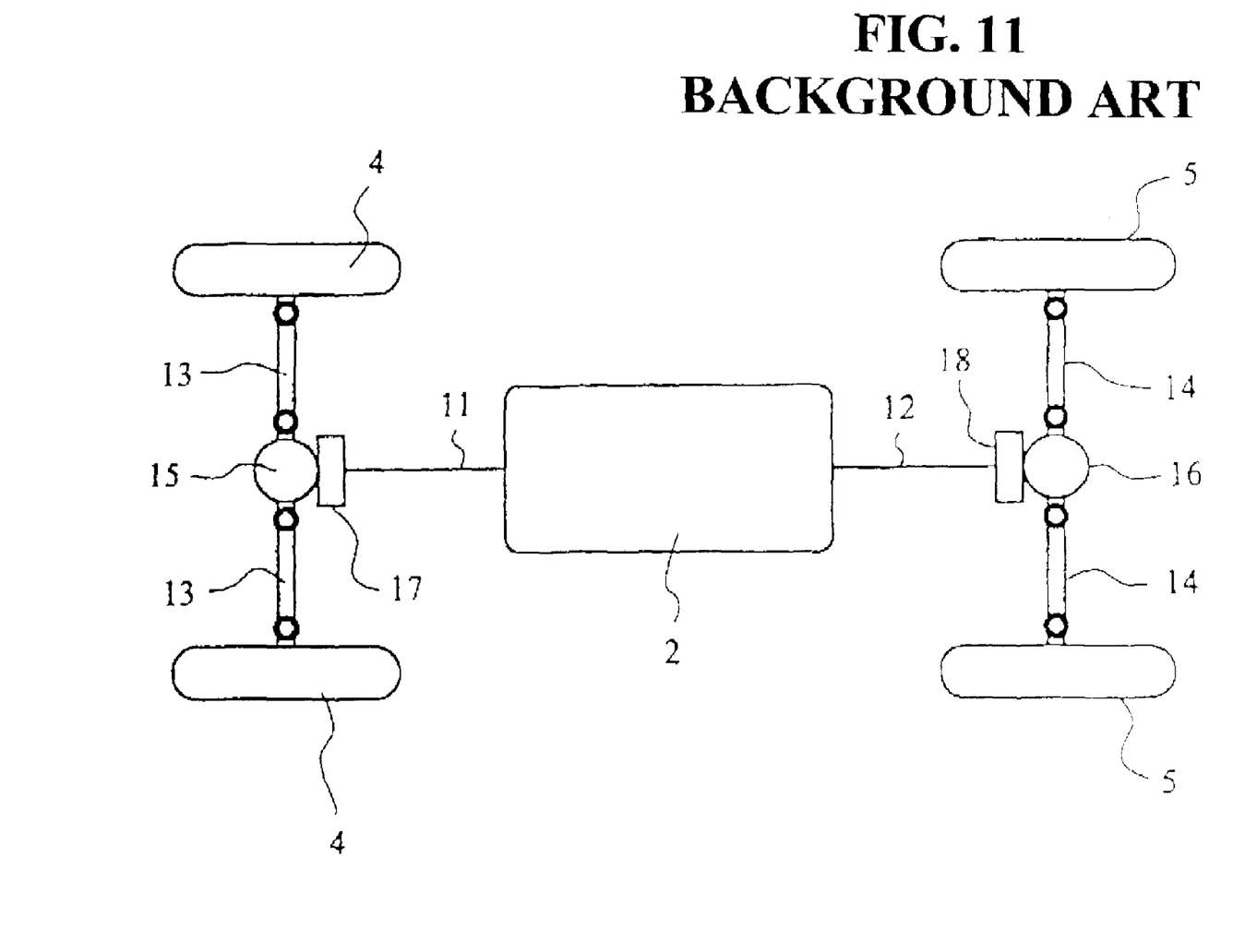
FIG. 11 is a plan view of an example according to the background art.

The final gear cases 15-16 are fixed to the vehicle body frame 3, and, as shown in FIG. 11, brake devices 17-18 are provided between the final gear cases 15-16 and the propeller shafts 11-12. Each of the brake devices 17-18 is operated by a braking operation of the rider M to brake each of the propeller shafts 11-12, thereby braking the front wheels 4 or the rear wheels 5.

In the above-mentioned vehicle of the background art, the present inventors have determined that the following problems may be improved. Specifically, the brake devices 17-18 periodically require maintenance such as replacement of brake pads and other component members.

However, the brake devices 17-18 are provided respectively between the final gear cases 15-16 and the propeller shafts 11-12, and these brake devices 17-18 are surrounded by other component parts of the vehicle 1, so that the surrounding space of these brake devices 17-18 is narrow. As a result of the narrow space surrounding the brake devices 17-18, maintenance is difficult and/or limited. Accordingly, enhancement of the ease of access and maintainability is desired. For example, on the side of the front wheels 4, a radiator, an oil cooler and the like disposed on the front side of the vehicle 1. On the side of the rear wheels 5, an air cleaner, a battery and the like are oppositely arranged. The surroundings of the brake devices 17-18 are increasingly narrow due to the presence of these component parts.

SUMMARY OF THE INVENTION

The present invention overcomes the shortcomings associated with the background art and achieves other advantages not realized by the background art.

An object of the present invention is to provide a brake device for vehicle for which maintenance work can be easily performed.

One or more of these and other objects are accomplished by a brake device for a vehicle, the vehicle including a vehicle body frame, an engine mounted on the vehicle body frame, front wheels and rear wheels suspended from and capable of being oscillated with respect to the vehicle body frame, final gear cases for transmitting an output from the engine to the front wheels and the rear wheels, and drive shafts for connecting the final gear cases to the rear wheels and the front wheels, the brake device comprising a brake disk fixed to at least one of the drive shafts, and a brake caliper for braking the brake disk by a nipping action, wherein the brake caliper is fitted to at least one of the final gear cases on the outer side of the vehicle body frame.

One or more of these and other objects are further accomplished by a braking system for a vehicle, the vehicle including a vehicle body frame, an engine mounted on the vehicle body frame, a pair of front wheels and a pair of rear wheels suspended from and capable of being oscillated with respect to the vehicle body frame, a front final gear case for transmitting an output from the engine to the front wheels and a rear final gear case for transmitting an output from the engine to the rear wheels, and front and rear drive shafts for connecting the final gear cases to the rear wheels and the front wheels, the braking system comprising a brake device; a brake disk fixed to at least one of the drive shafts, and a brake caliper for braking the brake disk by a nipping action, wherein the brake caliper is fitted to at least one of the front and rear final gear cases on the outer side of the vehicle body frame.

One or more of these and other objects are further accomplished by an all terrain vehicle comprising a vehicle body frame; an engine mounted on the vehicle body frame; a pair of front wheels and a pair of rear wheels suspended from and capable of being oscillated with respect to the vehicle body frame; front and rear final gear cases for transmitting an output from the engine to the front wheels and the rear wheels, respectively; front and rear drive shafts for connecting the final gear cases to the front wheels and the rear wheels, respectively, a brake device, the brake device having a brake disk fixed to at least one of the drive shafts, and a brake caliper for braking the brake disk by a nipping action, wherein the brake caliper is fitted to at least one of the final gear cases on the outer side of the vehicle body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
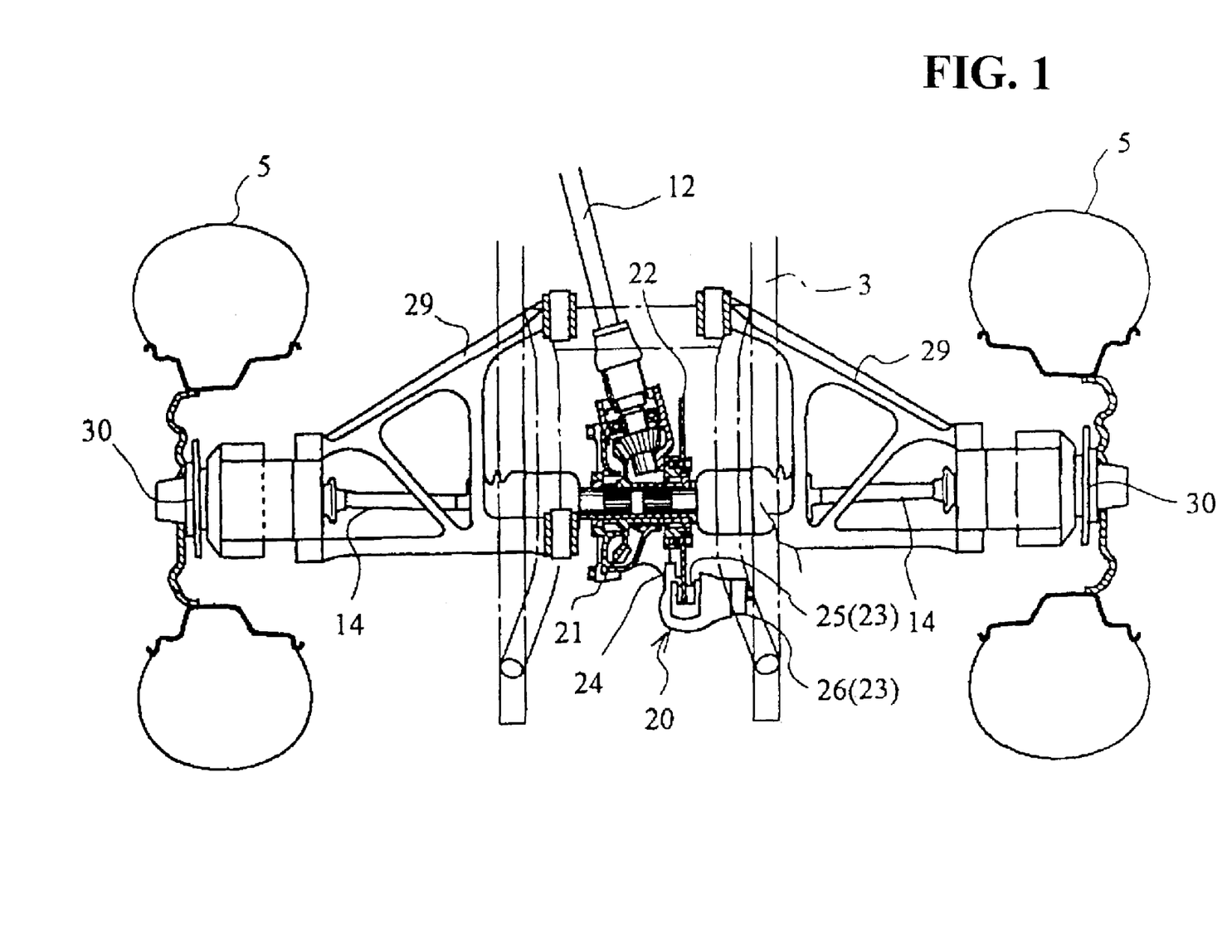
FIG. 1 is a plan view of a portion of an embodiment of the present invention.
Figure 2:
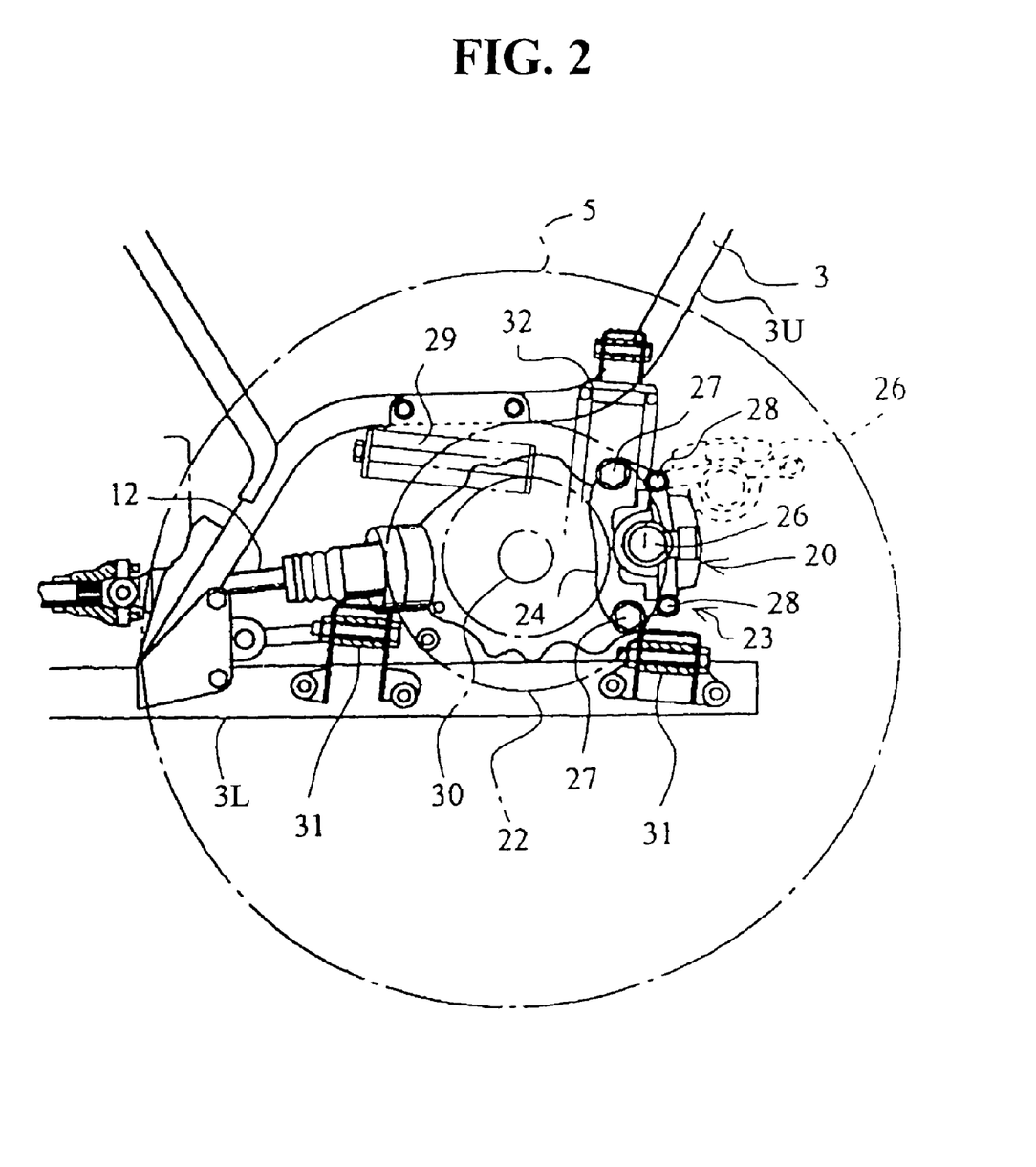
FIG. 2 is a side view of a portion of an embodiment of the present invention.
Figure 3:
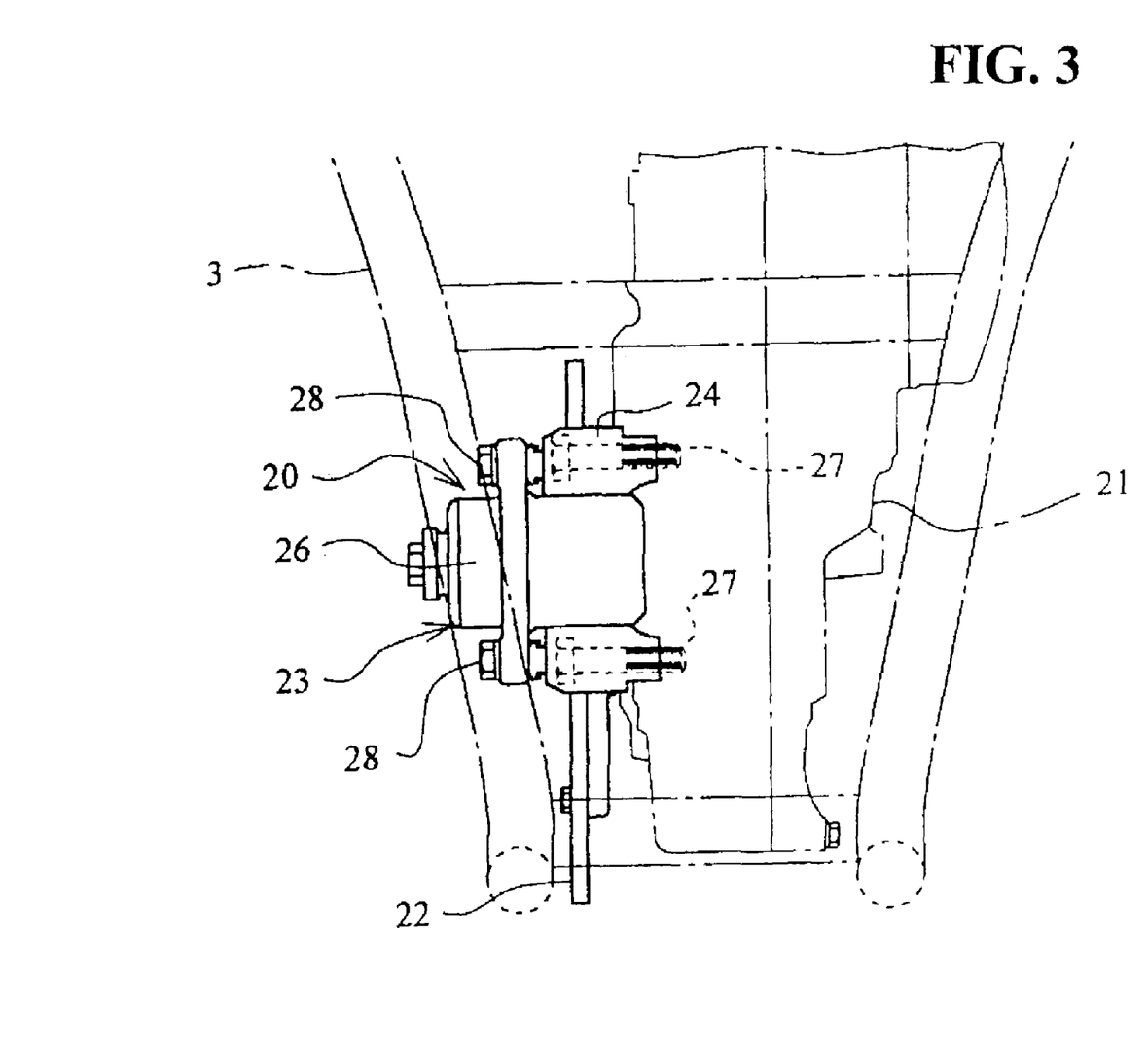
FIG. 3 is a schematic view of a portion of an embodiment of the present invention as viewed from the rear side of a vehicle.
Figure 4:
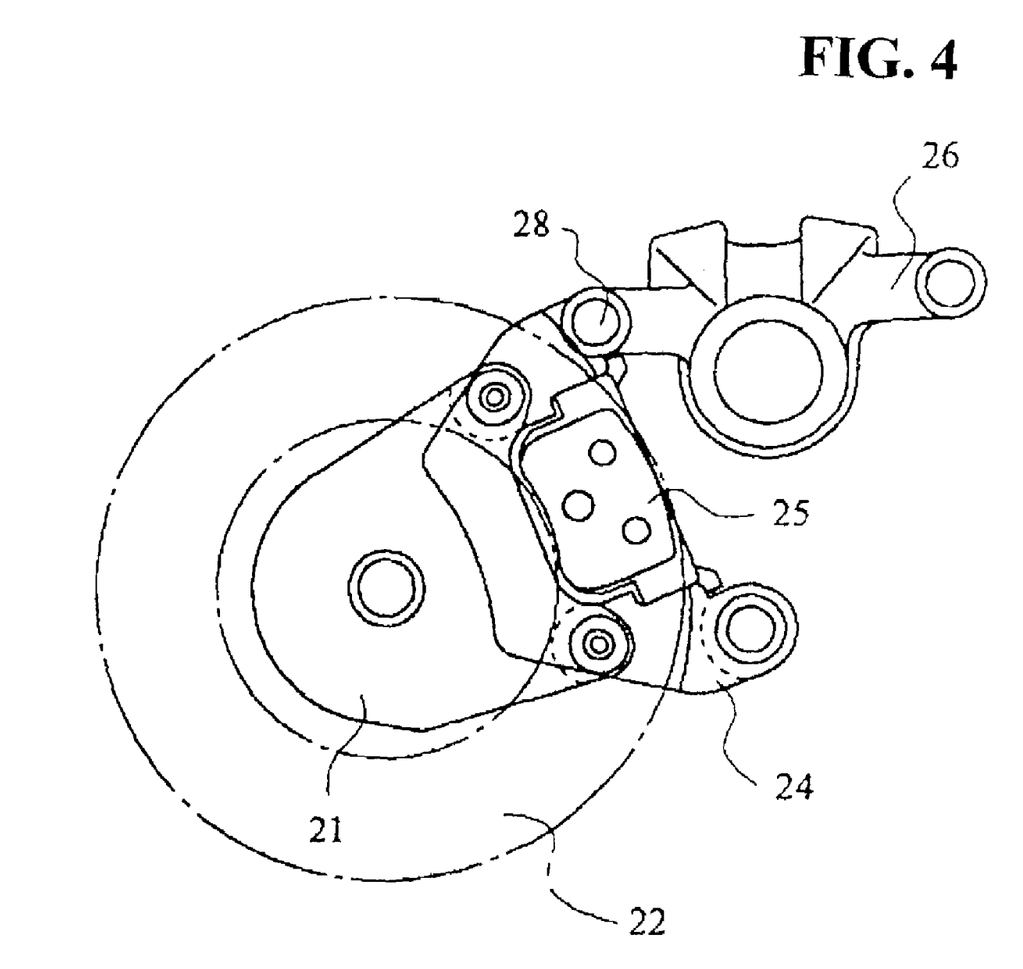
FIG. 4 is an enlarged side view of a portion of an embodiment of the present invention.
Figure 5:
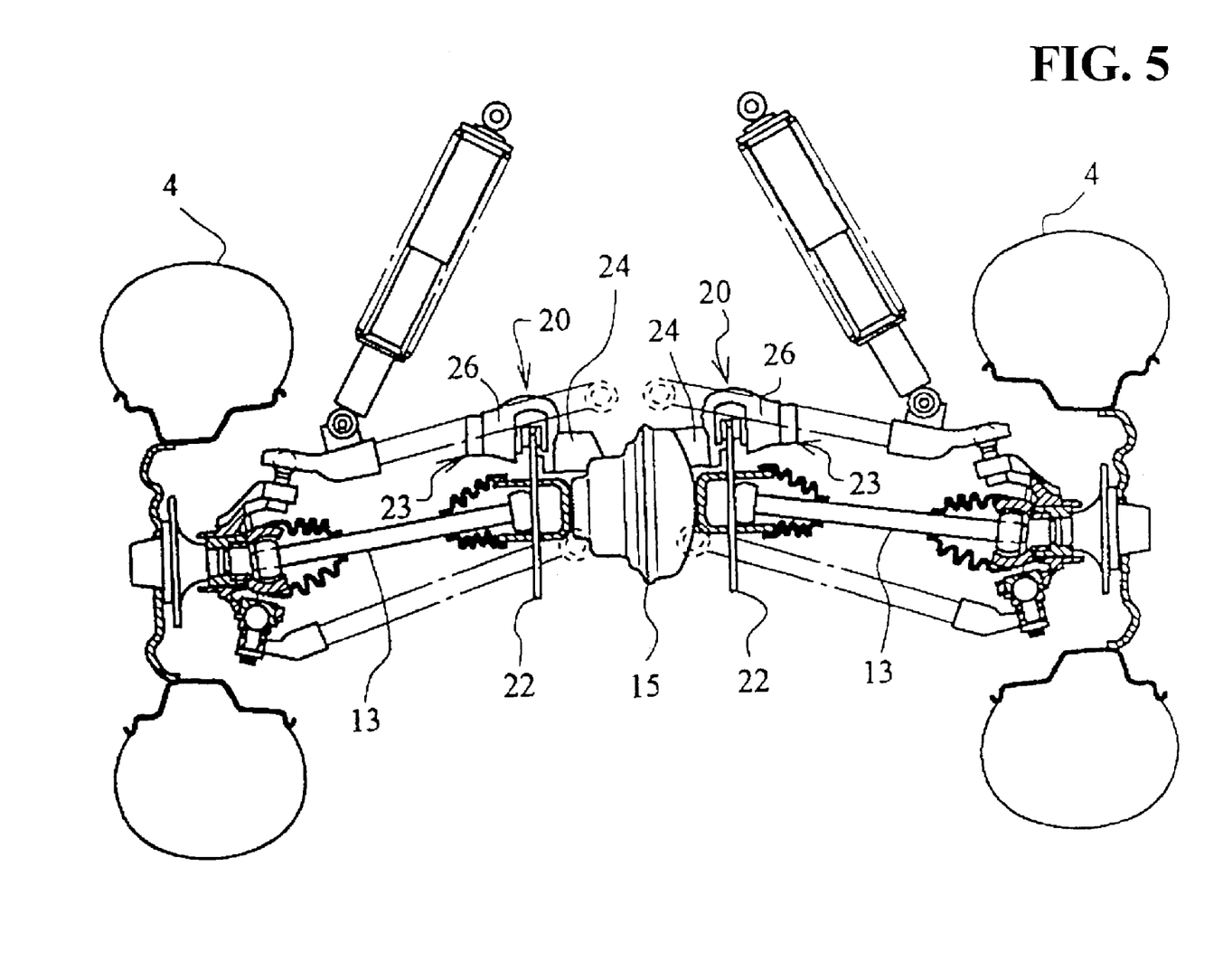
FIG. 5 is a front view of a portion of another embodiment of the present invention.
Figure 6:
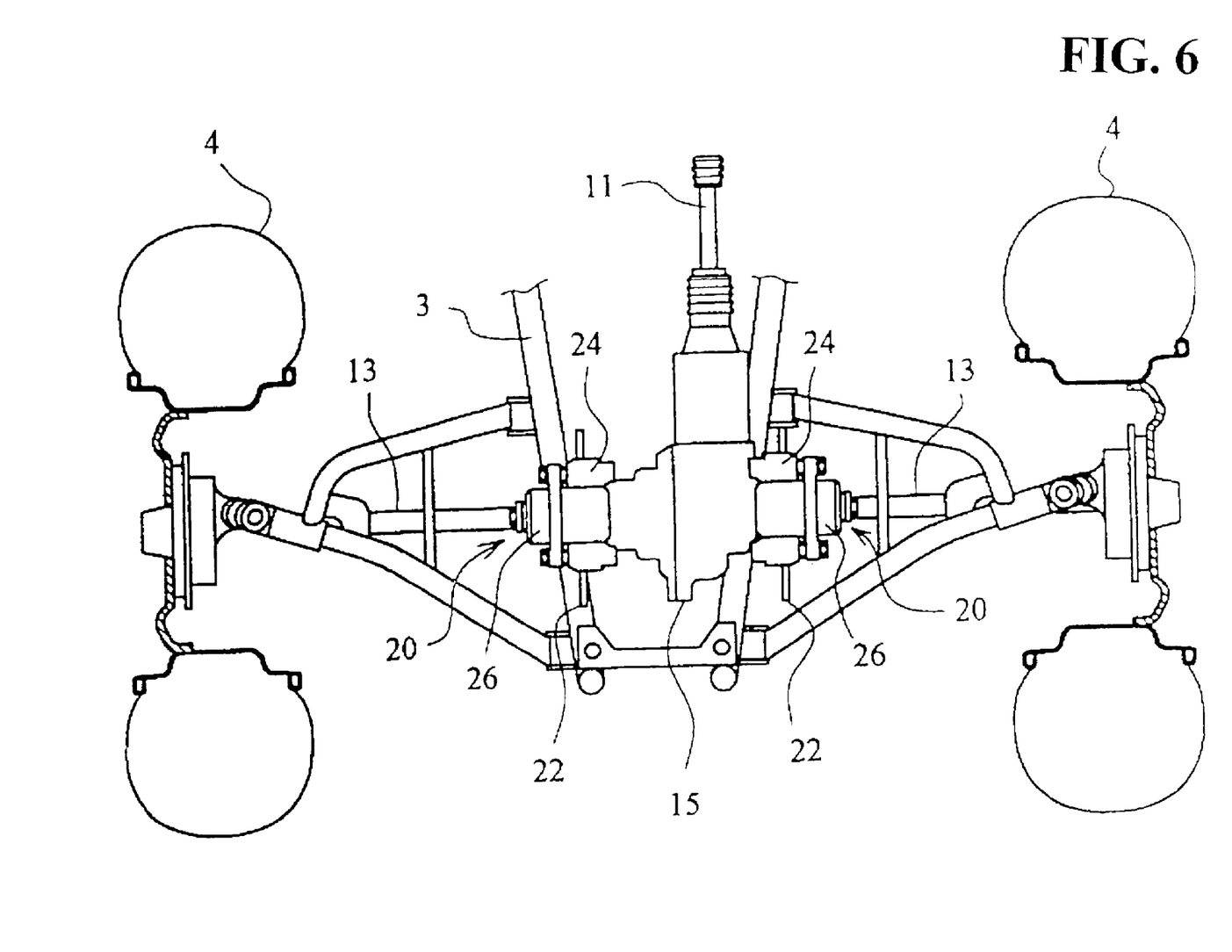
FIG. 6 is a plan view of a portion of another embodiment of the present invention.
Figure 7:
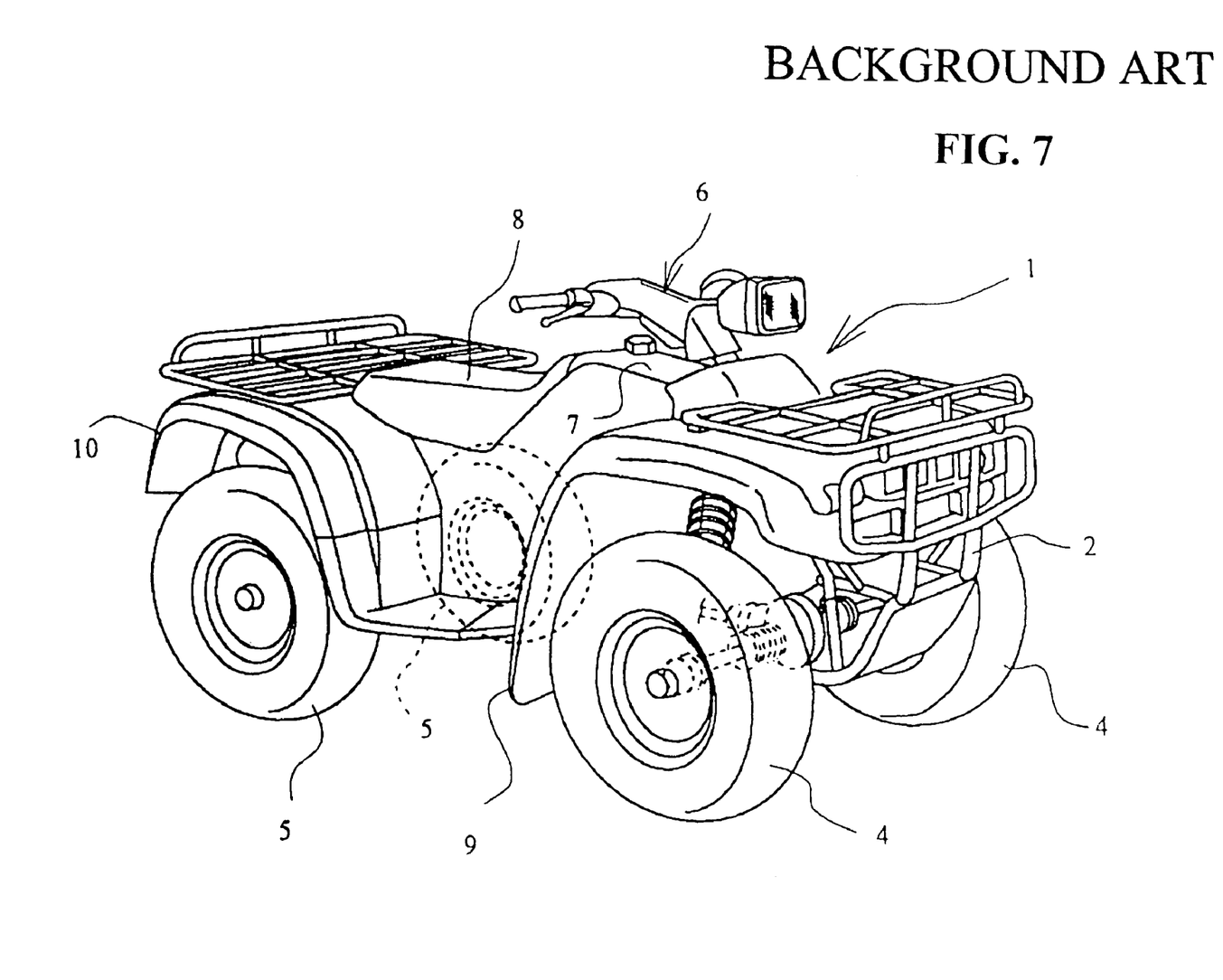
FIG. 7 is a perspective view showing an example of a vehicle for operation on uneven or rough terrain.
Figure 8:
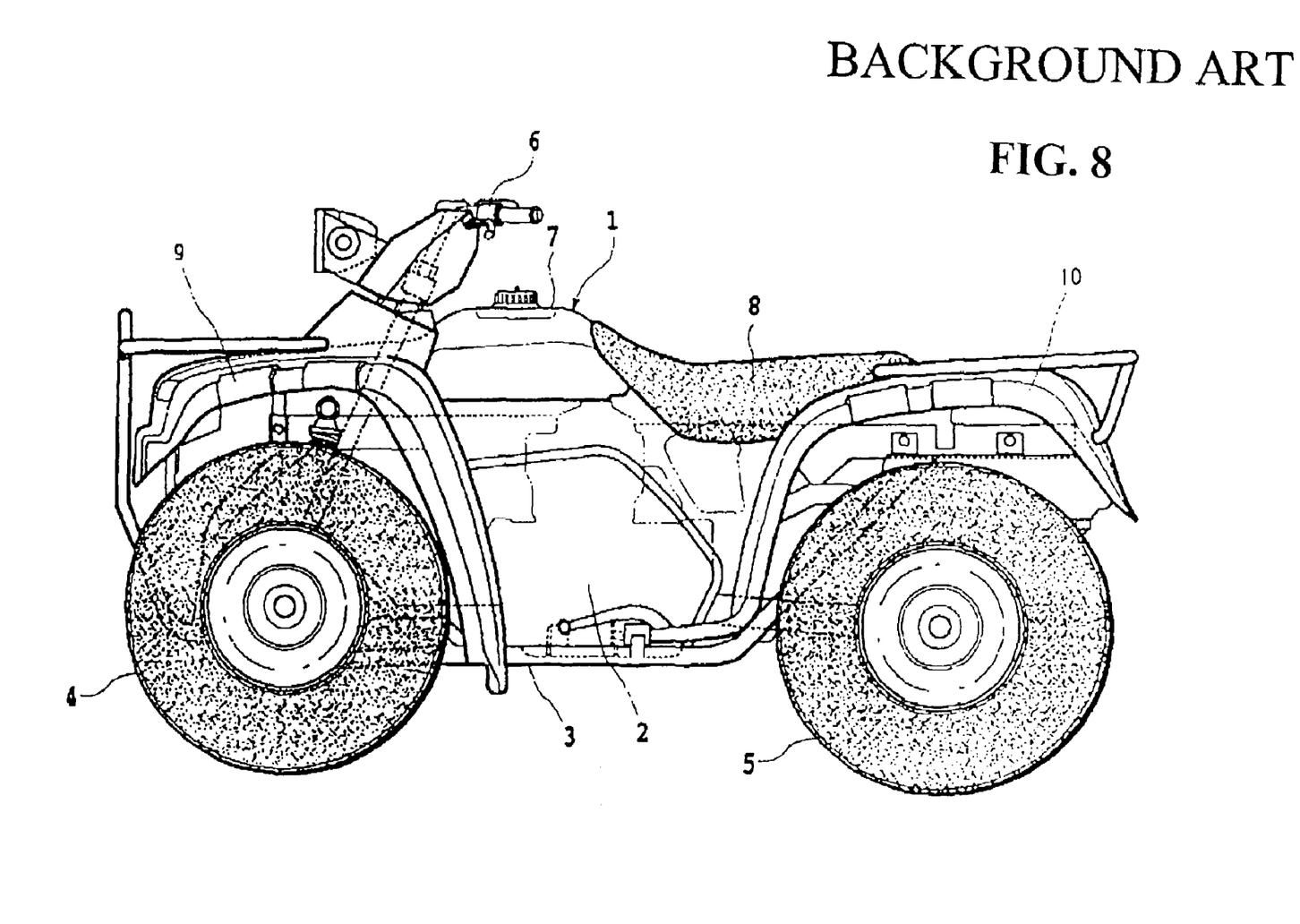
FIG. 8 is a side view of an example of the vehicle for running on uneven or rough terrain.
Figure 9:
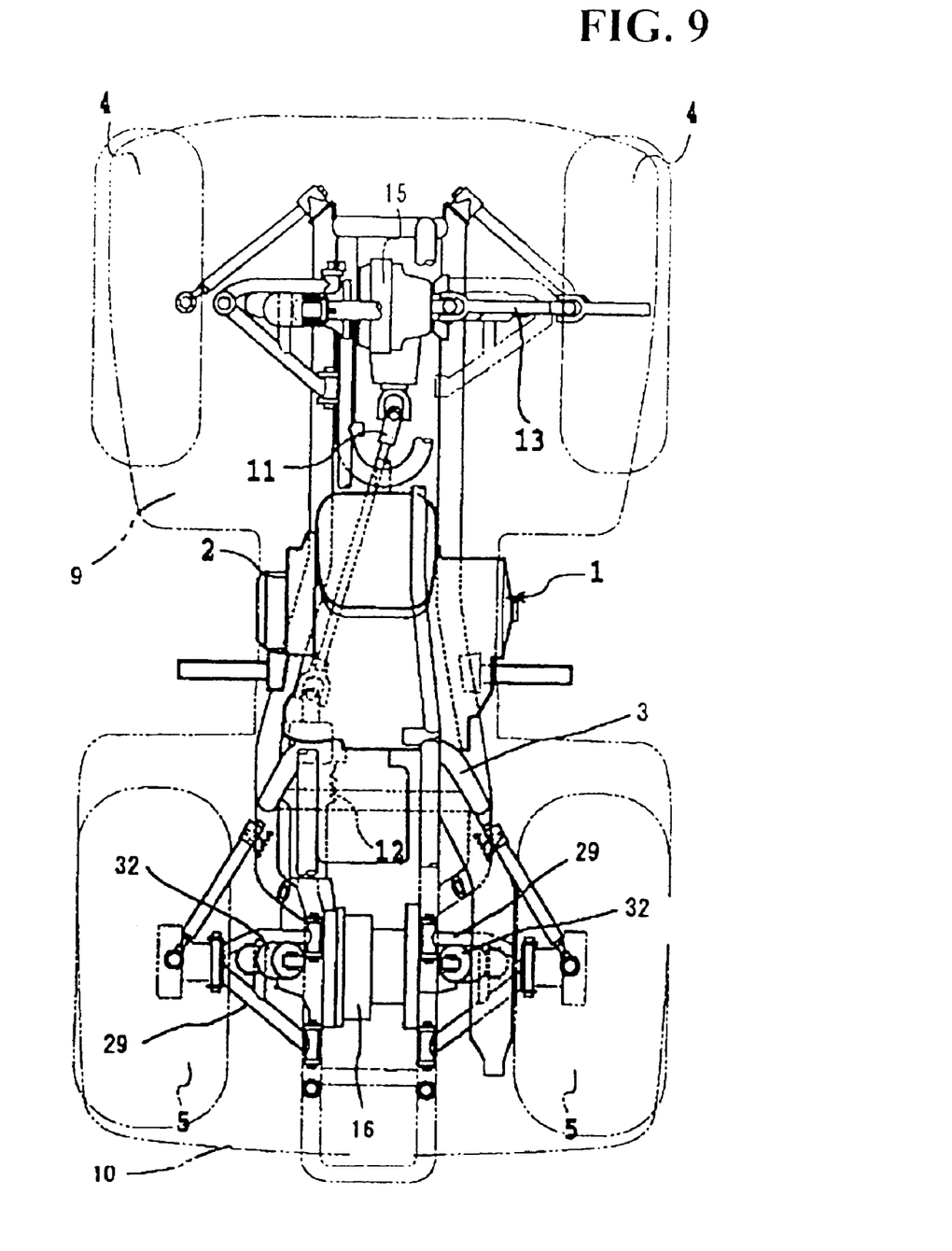
FIG. 9 is a schematic plan view of an exemplary frame of a vehicle for running on uneven or rough terrain.
Figure 10:
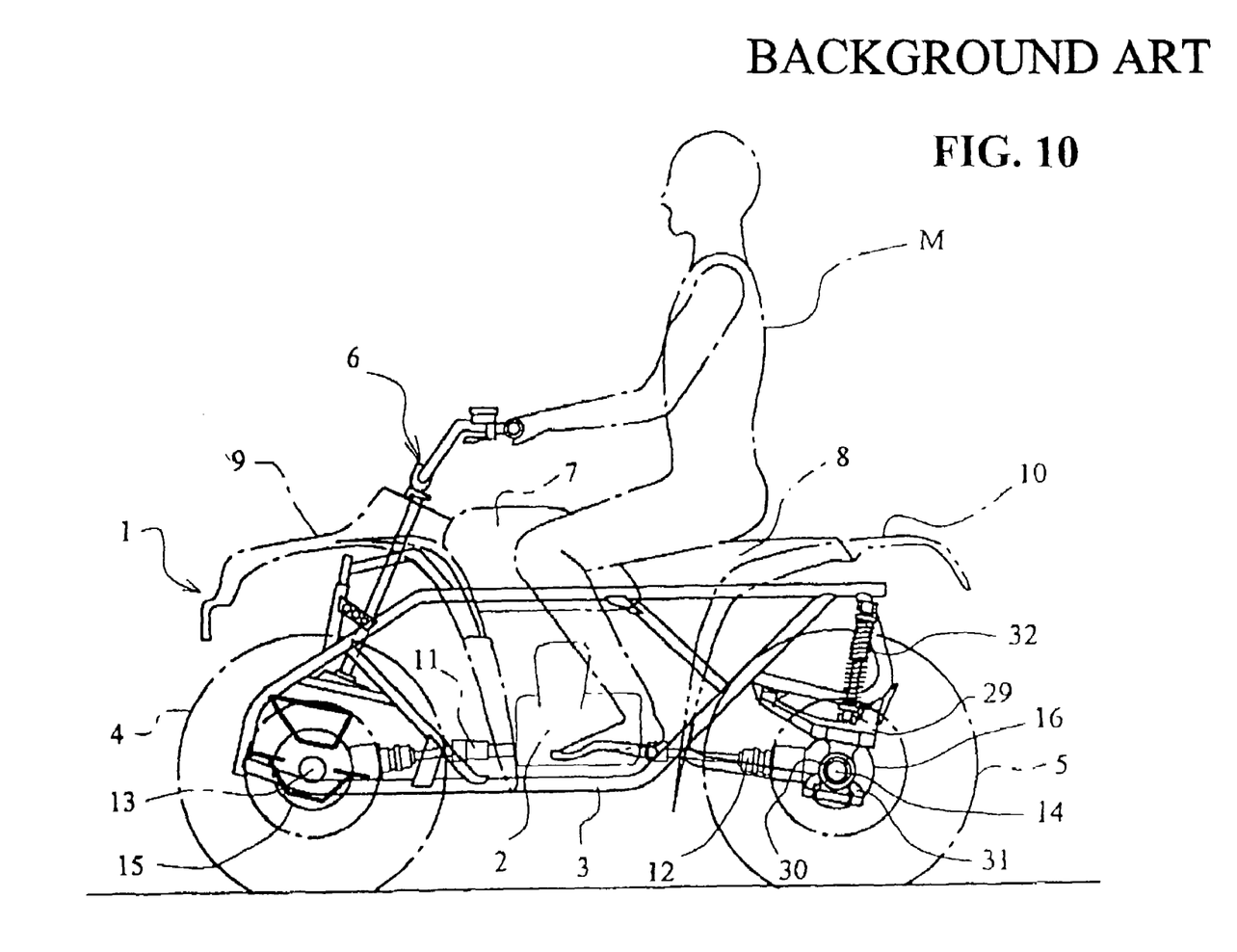
FIG. 10 is a schematic side view of the vehicle for running on uneven or rough terrain.

The present invention will hereinafter be described with reference to the accompanying drawings. FIG. 1 is a plan view of a portion of an embodiment of the present invention. FIG. 2 is a side view of a portion of an embodiment of the present invention. FIG. 3 is a schematic view of a portion of an embodiment of the present invention as viewed from the rear side of a vehicle. FIG. 4 is an enlarged side view of a portion of an embodiment of the present invention. FIG. 5 is a front view of a portion of another embodiment of the present invention. FIG. 6 is a plan view of a portion of another embodiment of the present invention. FIG. 7 is a perspective view showing an example of a vehicle for operation on uneven or rough terrain. FIG. 8 is a side view of an example of the vehicle for running on uneven or rough terrain. FIG. 9 is a schematic plan view of an exemplary frame of a vehicle for running on uneven or rough terrain. FIG. 10 is a schematic side view of the vehicle for running on uneven or rough terrain.

The present embodiment shows an example of the application of the present invention to a vehicle for running on rough or uneven terrain, e.g., as shown in FIG. 10. Major component members of the vehicle of the present invention are the same as though shown in the vehicle of the aforementioned figures, e.g., FIG. 10.

The brake device 20 for a vehicle according to the present embodiment is used for a vehicle which, as shown in FIG. 1, includes a vehicle body frame 3, an engine 2 mounted on the vehicle body frame 3, a final gear case 21 for transmitting an output from the engine 2 to rear wheels 5 capable of being oscillated with respect to and suspended from the vehicle body frame 3, and drive shafts 14 for connecting the final gear case 21 to the rear wheels 5. The brake device 20 includes a brake disk 22 fixed to the drive shaft 14, and a brake caliper 23 for braking by nipping the brake disk 22, wherein the brake caliper 23 is generally fitted to the final gear case 21 on the outer side of the vehicle body.

These members will be described in greater detail hereinafter. As shown in FIG. 1, the brake disk 22 is fitted to a base portion of the drive shaft 14 in the vicinity of the final gear case 21. As shown in FIGS. 2 to 4, the brake caliper 23 is of the collet type, including a caliper bracket 24 fitted to the final gear case 21, and a caliper body 26 which is detachably fitted to the caliper bracket 24 and in which a piston for pressing a brake pad 25 (as shown in FIG. 4 and described later) against the brake disk 22 is incorporated.

As shown in FIGS. 2 and 3, the caliper bracket 24 is fixed to the final gear case 21 on the outside of the vehicle and on the rear side of the vehicle by a pair of bolts 27, and the caliper body 26 is fitted to the caliper bracket 24 by a pair of bolts 28. As shown in FIGS. 2 and 4, the caliper body 26 is turnable with the respect to the remaining of the bolts 28 serving as a center axis in the condition where one of the bolts 28 is removed. In the condition where the caliper body 26 is rotated in a direction away from the caliper bracket 24, the brake pad 25 is left on the side of the caliper bracket 24, e.g., as shown in FIG. 4.

In FIG. 10, an upper arm 29 rotatably connected to an upper portion of the vehicle body frame 3 and to an upper portion of an axle housing 30 is fitted to the rear wheel 5. A lower arm 31 rotatably connected to a lower portion of the vehicle body frame 3 and to a lower portion of the axle housing 30 and a shock absorber 32 arranged between the upper arm 29 and the vehicle body frame 3 are also provided on the vehicle body frame 3. The upper arm 29, the lower arm 31, and the shock absorber 32 include a suspension device for the rear wheel 5.

In the brake device 20 according to this embodiment as described hereinabove, the brake disk 22 having the brake device 20 is fitted to the drive shaft 14, and the brake caliper 23 for braking by nipping the brake disk 22 is fitted to the final gear case 21 on the outer side of the vehicle 1.

The drive shaft 14 is only located on a lateral side of the final gear case 21. The upper arm 29, the lower arm 31 and the shock absorber 32 having the suspension device for the rear wheel 5 are arranged and distributed to the upper and lower sides of the drive shaft 14, e.g., as shown in FIG. 2 whereby the brake device 20 fitted to the final gear case 21. Accordingly, there are few obstacles at the time of maintenance of the brake device 20, and maintenance work can be easily carried out with the present invention.

Since the brake device 20 is disposed on the rear side of the final gear case 21 in the present embodiment, the brake device 20 is located on the rear side of the vehicle body frame 3 where there are fewer component members of the vehicle 1. Accordingly, maintenance work is easier with the present embodiment. Furthermore, in the present embodiment, since the brake caliper 23 is of the collet type, the brake pad 25 can be exposed as shown in FIG. 4 by turning the caliper body 26 relative to the caliper bracket 24, and, therefore, replacement of the brake pad 25 can be easily carried out.

The shapes, dimensions and the like of the component members shown in the present embodiment as described above are mere examples, and they can be modified based on various design requirements. For example, while an example of application of the brake device 20 to the rear wheel 5 has been shown in the present embodiment described above, the brake device 20 can also be applied to the front wheel 4, as shown in FIGS. 5 and 6. In FIGS. 5 and 6, an example where the brake devices 20 are provided on both sides of the final gear case 15, between the final gear case 15 and a pair of drive shafts 13, respectively is shown in greater detail.

As has been described above, according to the brake device for vehicle of the present invention, the brake caliper is provided on the outer side with respect to the vehicle of the final gear case, so that the brake device can be directed to a direction where there are few component parts of the vehicle, whereby maintenance of the brake device is more easily performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake device for a vehicle, said vehicle including a vehicle body having a vehicle frame, an engine mounted on said vehicle body frame, right and left front wheels and right and left rear wheels suspended from and capable of being individually oscillated with respect to said vehicle body frame, final gear cases for transmitting an output from said engine to said front wheels and said rear wheels, and drive shafts for connecting said final gear cases to said rear wheels and said front wheels, said brake device comprising:
    a brake disk fixed to at least one of said drive shafts in a position between said at least one final gear case and a respective wheel of said front and rear wheels, and
    a brake caliper for braking said brake disk by a nipping action, wherein said brake caliper is fitted to at least one of said final gear cases and is secured in a position on a side of the vehicle frame that is not surrounded by any structural member of the vehicle frame and in a position between said at least one final gear case and the respective wheel of said front and rear wheels, said brake caliper being secured to at least one of said final gear cases and being rotatable with respect to the at least one of said final gear cases between a first position and a second position,
    wherein the vehicle includes an upper frame member and an lower frame member, an upper suspension arm being rotatably connected to upper frame member, and a lower suspension arm being rotatably connected to lower frame member, so that rear portions of the upper suspension arm and the lower suspension arm do not connect with one another, thereby providing a space for the brake caliper to be disposed below the upper frame and above the lower frame.

2. The brake device for a vehicle according to claim 1, wherein said brake caliper is a collet brake caliper.

3. The brake device for a vehicle according to claim 1, wherein said brake caliper is a collet brake caliper, said brake caliper including a caliper bracket fitted to the at least one final gear case, a caliper body detachably fitted to the caliper bracket and a piston for pressing a brake pad against the brake disk.

4. The brake device for a vehicle according to claim 3, wherein the caliper bracket is fixed to the final gear case on the side of the vehicle frame by a pair of bolts and the caliper body is fitted to the caliper bracket by a pair of bolts.

5. A brake device for a vehicle, said vehicle including a vehicle body having a vehicle frame, an engine mounted on said vehicle body frame, right and left front wheels and right and left rear wheels suspended from and capable of being individually oscillated with respect to said vehicle body frame, final gear cases for transmitting an output from said engine to said front wheels and said rear wheels, and drive shafts for respectively connecting said front and rear final gear cases to said rear wheels and said front wheels, said brake device comprising:
    a brake disk fixed to at least one of said drive shafts in a position between the final gear case and said rear wheels,
    a caliper bracket fixed to a lateral side of the rear final gear case on the outside of the vehicle, and
    a brake caliper for braking said brake disk by a nipping action, wherein said brake caliper is bolted to a lateral side of the caliper bracket fixed to the lateral side of said rear final gear case for said rear wheels and is secured in a position between said lateral side of said rear final gear case and the rear wheels, wherein said brake caliper is disposed on a rear side of the vehicle body, and
    wherein said brake caliper is a collet brake caliper.

6. The brake device for a vehicle according to claim 5, wherein said brake caliper is accessible for maintenance from a rearward position of said vehicle.

7. A braking system for a vehicle, said vehicle including a vehicle body having a vehicle frame, an engine mounted on said vehicle body frame, a pair of right and left front wheels and a pair of right and left rear wheels suspended from and capable of being individually oscillated with respect to said vehicle body frame, a front final gear case for transmitting an output from said engine to said front wheels and a rear final gear case for transmitting an output from said engine to said rear wheels, and front and rear drive shafts for connecting said final gear cases to said rear wheels and said front wheels, said braking system comprising:
    a brake device including;
        a first brake disk fixed to at least one of said drive shafts in a position between said front or rear final gear case and a respective wheel of said front and rear wheels, and
        a first caliper bracket fixed to a lateral side of the at least one of the final gear cases on the outside of the vehicle, and
        a first brake caliper for braking said brake disk by a nipping action, wherein said first brake caliper is bolted to a lateral side of the first caliper bracket fixed to a lateral side of at least one of said front and rear final gear cases and is secured in a position between said lateral side of said front or rear final gear case and the respective wheel of said front and rear wheels, and wherein said first brake caliper is a collet brake caliper.

8. The brake device for a vehicle according to claim 7, wherein said at least one final gear case is the final gear case for said rear wheels, and said first brake caliper is fitted to said final gear case for said rear wheels and on a right side of the vehicle frame, wherein said side of the vehicle frame is a rear side of the vehicle body frame.

9. The brake device for a vehicle according to claim 7, wherein a second brake caliper is fitted to said front final gear case and a second brake disk is fitted to at least one front drive shaft.

10. The brake device for a vehicle according to claim 7, wherein said first brake caliper is fitted to said rear final gear case and said first brake disk is fitted to a right rear drive shaft.

11. The brake device for a vehicle according to claim 9, wherein said first brake caliper is fitted to said rear final gear case and said brake disk is fitted to a right rear drive shaft.

12. The brake device for a vehicle according to claim 7, wherein said first brake caliper includes a caliper body detachably fitted to the first caliper bracket and a piston for pressing a brake pad against the first brake disk.

13. The brake device for a vehicle according to claim 12, wherein the caliper bracket is fixed to the rear final gear case on the side of the vehicle frame by a pair of bolts and the caliper body is fitted to the caliper bracket by a pair of bolts.

14. An all terrain vehicle comprising:
   a vehicle body having a vehicle frame;
   an engine mounted on said vehicle body frame;
   a pair of right and left front wheels and a pair of right and left rear wheels suspended from and capable of being individually oscillated with respect to said vehicle body frame;
   front and rear final gear cases for transmitting an output from said engine to said front wheels and said rear wheels, respectively;
   front and rear drive shafts for connecting said final gear cases to said front wheels and said rear wheels, respectively,
   a brake device, said brake device having
      a brake disk fixed to at least one of said drive shafts in a position between said front or rear final gear case and a respective wheel of said front and rear wheels, and
      a caliper bracket fixed to a lateral side of the at least one of the final gear cases on the outside of the vehicle, and
      a brake caliper for braking said brake disk by a nipping action, wherein said brake caliper is bolted to a lateral side of the caliper bracket fixed to at least one of said final gear cases and is secured in a position between said lateral side of said front or rear final gear case and the respective wheel of said front and rear wheels, said brake caliper being rotatable with respect to the at least one of said final gear cases between a first position and a second position.

15. The brake device for a vehicle according to claim 14, wherein said brake caliper is a collet brake caliper, said brake caliper including a caliper body detachably fitted to the caliper bracket and a piston for pressing a brake pad against the brake disk.

16. The brake device for a vehicle according to claim 15, wherein the caliper bracket is fixed to the at least one final gear case on a right side of the vehicle frame by a pair of bolts and the caliper body is fitted to the caliper bracket by a pair of bolts.

* * * * *